(12) United States Patent
Tian et al.

(10) Patent No.: US 10,620,500 B2
(45) Date of Patent: Apr. 14, 2020

(54) ARRAY SUBSTRATE, DISPLAY PANEL AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Maokun Tian, Beijing (CN); Rui Wang, Beijing (CN); Zhonghao Huang, Beijing (CN); Wei Chen, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 48 days.

(21) Appl. No.: 15/964,171

(22) Filed: Apr. 27, 2018

(65) Prior Publication Data
US 2019/0101802 A1    Apr. 4, 2019

(30) Foreign Application Priority Data
Sep. 29, 2017    (CN) ............... 2017 2 1271978 U

(51) Int. Cl.
G02F 1/1343    (2006.01)
G02F 1/1362    (2006.01)
G02F 1/1333    (2006.01)

(52) U.S. Cl.
CPC ...... *G02F 1/136286* (2013.01); *G02F 1/1343* (2013.01); *G02F 1/133345* (2013.01); *G02F 1/134309* (2013.01); *G02F 1/136213* (2013.01); *G02F 2201/121* (2013.01); *G02F 2201/122* (2013.01); *G02F 2201/123* (2013.01)

(58) Field of Classification Search
CPC ................................. G02F 1/136213
See application file for complete search history.

(56) References Cited

U.S. PATENT DOCUMENTS

| | | | |
|---|---|---|---|
| 2001/0010567 A1* | 8/2001 | Rho | G02F 1/133345 349/43 |
| 2014/0362323 A1* | 12/2014 | Nakano | G02F 1/136213 349/46 |

* cited by examiner

*Primary Examiner* — James A Dudek
(74) *Attorney, Agent, or Firm* — Brooks Kushman P.C.

(57) ABSTRACT

An array substrate is provided, including a plurality of pixel unit pairs arranged in an array and defined by mutually intersected gate lines and data lines. Two of the gate lines are arranged between the pixel unit pairs in adjacent rows, each pixel unit pair includes a first pixel unit and a second pixel unit, and a gate insulation layer, a first metal layer, a passivation layer and a pixel electrode layer are stacked on a base substrate and arranged between the first pixel unit and the second pixel unit. Orthographic projections of the pixel electrode layer and the first metal layer onto the base substrate partially overlap to form a storage capacitor, and the first metal layer is connected to a common electrode layer of each pixel unit pair in a lap joint manner.

15 Claims, 3 Drawing Sheets

ARRAY SUBSTRATE, DISPLAY PANEL AND DISPLAY DEVICE

CROSS-REFERENCE TO RELATED APPLICATION

This application claims priority to Chinese Patent Application No. 201721271978.7 filed on Sep. 29, 2017, which is incorporated herein by reference in its entirety.

TECHNICAL FIELD

The present disclosure relates to the field of display technologies, in particular to an array substrate, a display panel and a display device.

BACKGROUND

In a twisted nematic liquid crystal display (TN-LCD) in the related art, generally, a pixel electrode ITO and a common electrode COM overlap to form a storage capacitor, the common electrode is arranged around the pixel electrode. An overlapping part between the common electrode and the pixel electrode is opaque, so an aperture ratio of pixels will be reduced if a capacitance of the storage capacitor is increased, while the capacitance of the storage capacitor will be too small to meet the requirement if it is designed to maintain a large aperture ratio.

SUMMARY

In a first aspect, the present disclosure provides an array substrate. The array substrate includes a plurality of pixel unit pairs arranged in an array and defined by mutually intersected gate lines and data lines, where two of the gate lines are arranged between the pixel unit pairs in adjacent rows, each of the pixel unit pairs includes a first pixel unit and a second pixel unit, and a gate insulation layer, a first metal layer, a passivation layer and a pixel electrode layer are stacked on a base substrate and between the first pixel unit and the second pixel unit; where an orthographic projection of the pixel electrode layer onto the base substrate at least partially overlaps an orthographic projection of the first metal layer onto the base substrate to form a storage capacitor, and the first metal layer is connected to a common electrode layer of each pixel unit pair in a lap joint manner.

Optionally, the first metal layer is arranged in an identical layer to a source and drain electrode layer of a thin film transistor of each pixel unit pair.

Optionally, the common electrode layer is arranged in an identical layer to a gate electrode layer of a thin film transistor of each pixel unit pair.

Optionally, the passivation layer is provided with a lapping hole configured to connect the first metal layer to the common electrode layer of each pixel unit pair in the lap joint manner, and a conductive layer is arranged in the lapping hole to enable the first metal layer to be connected to the common electrode layer of each pixel unit pair in the lap joint manner.

Optionally, the conductive layer is arranged in an identical layer to the pixel electrode layer.

Optionally, the array substrate is a twisted nematic liquid crystal display (TN-LCD) array substrate.

Optionally, the array substrate is of a Z-inverted-shaped pixel structure.

Optionally, a thickness of the passivation layer is from 2500 Å to 6000 Å.

Optionally, a thickness of the gate insulation layer is from 3000 Å to 4000 Å.

Optionally, the common electrode layer is at a side of the first metal layer closing to the base substrate.

Optionally, an orthographic projection of the passivation layer onto the base substrate at least partially overlaps orthographic projections of the pixel electrode layer and the first metal layer onto the base substrate.

Optionally, the orthographic projection of the first metal layer onto the base substrate at least partially overlaps an orthographic projection of the common electrode layer onto the base substrate.

Optionally, an extending direction of the first metal layer is parallel to an extending direction of each of the data lines.

Optionally, the common electrode layer and the first metal layer are arranged around the first pixel unit and the second pixel unit, and the common electrode layer and the first metal layer around the first pixel unit and the second pixel unit form a Z-shaped structure.

Optionally, the conductive layer is in direct contact with the first metal layer and the common electrode layer.

In a second aspect, the present disclosure provides a display panel, which includes an array substrate. The array substrate includes a plurality of pixel unit pairs arranged in an array and defined by mutually intersected gate lines and data lines, where two of the gate lines are arranged between the pixel unit pairs in adjacent rows, each of the pixel unit pairs includes a first pixel unit and a second pixel unit, and a gate insulation layer, a first metal layer, a passivation layer and a pixel electrode layer are stacked on a base substrate and between the first pixel unit and the second pixel unit; where an orthographic projection of the pixel electrode layer onto the base substrate at least partially overlaps an orthographic projection of the first metal layer onto the base substrate to form a storage capacitor, and the first metal layer is connected to a common electrode layer of each pixel unit pair in a lap joint manner.

In a third aspect, the present disclosure provides a display device, which includes a display panel. The display panel includes an array substrate. The array substrate includes a plurality of pixel unit pairs arranged in an array and defined by mutually intersected gate lines and data lines, where two of the gate lines are arranged between the pixel unit pairs in adjacent rows, each of the pixel unit pairs includes a first pixel unit and a second pixel unit, and a gate insulation layer, a first metal layer, a passivation layer and a pixel electrode layer are stacked on a base substrate and between the first pixel unit and the second pixel unit; where an orthographic projection of the pixel electrode layer onto the base substrate at least partially overlaps an orthographic projection of the first metal layer onto the base substrate to form a storage capacitor, and the first metal layer is connected to a common electrode layer of each pixel unit pair in a lap joint manner.

DETAILED DESCRIPTION

Technical solutions of embodiments of the present disclosure are illustrated clearly and completely in conjunction with drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

Figure 1:
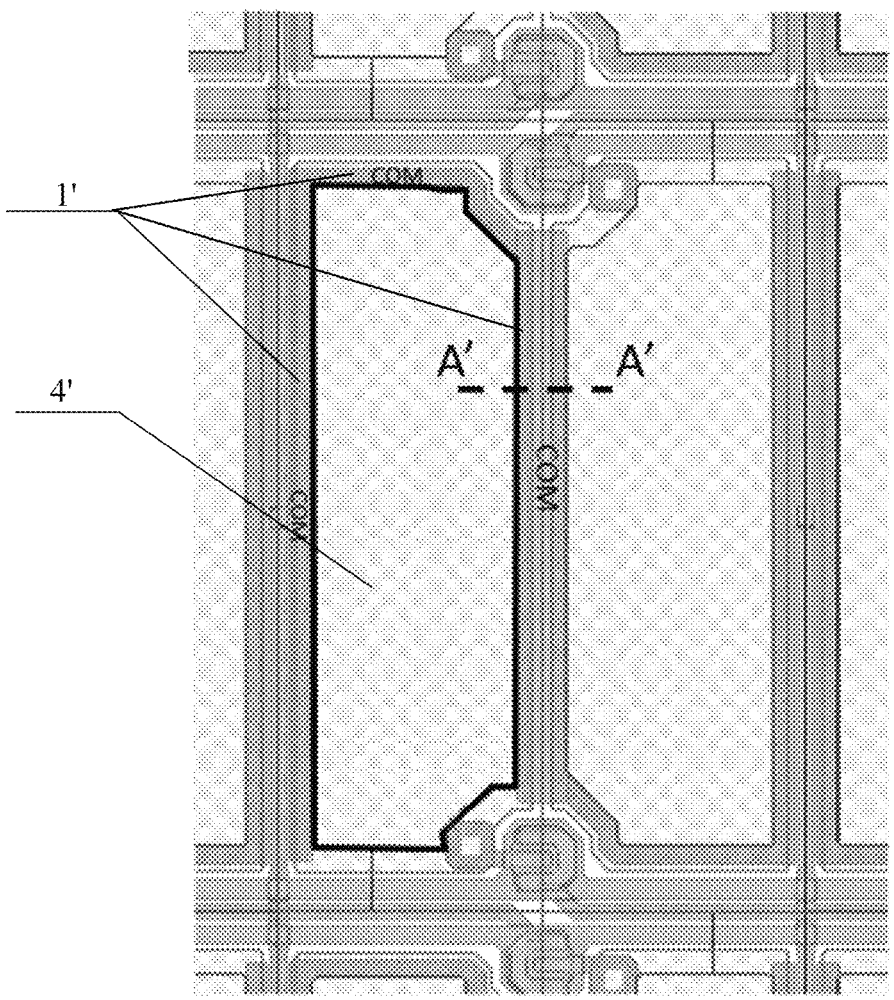
FIG. 1 is a plan view of a part of an array substrate in the related art.
Figure 2:
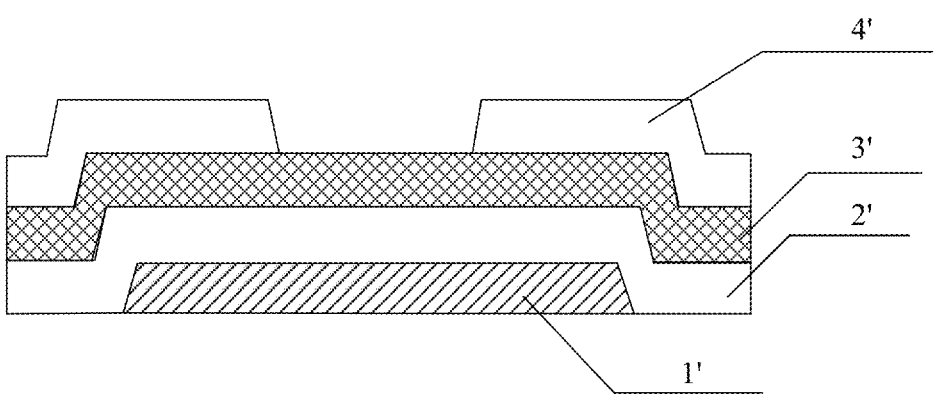
FIG. 2 is a sectional view of the array substrate taken along line A'-A' of FIG. 1.

In the related art, as shown in FIG. 1, a common electrode 1' is arranged around a pixel electrode 4', and the common electrode 1' and the pixel electrode 4' overlap to form a storage capacitor Cst. Reference is made to FIG. 2, which is a sectional view of an array substrate taken along line A'-A' of FIG. 1. The common electrode 1' is arranged in an identical layer to a gate electrode layer of a thin film transistor of a pixel corresponding to the common electrode 1', and the common electrode 1', the pixel electrode 4', a gate insulation layer 2' and a passivation layer 3' between the common electrode 1' and the pixel electrode 4' form the storage capacitor Cst together. An overlapping part between the common electrode 1' and the pixel electrode 4' is opaque. If a capacitance of the storage capacitor is increased, an aperture ratio of pixels will be reduced, and if it is designed to maintain a large aperture ratio, the capacitance of the storage capacitor will be too small to meet the requirement.

Figure 3:
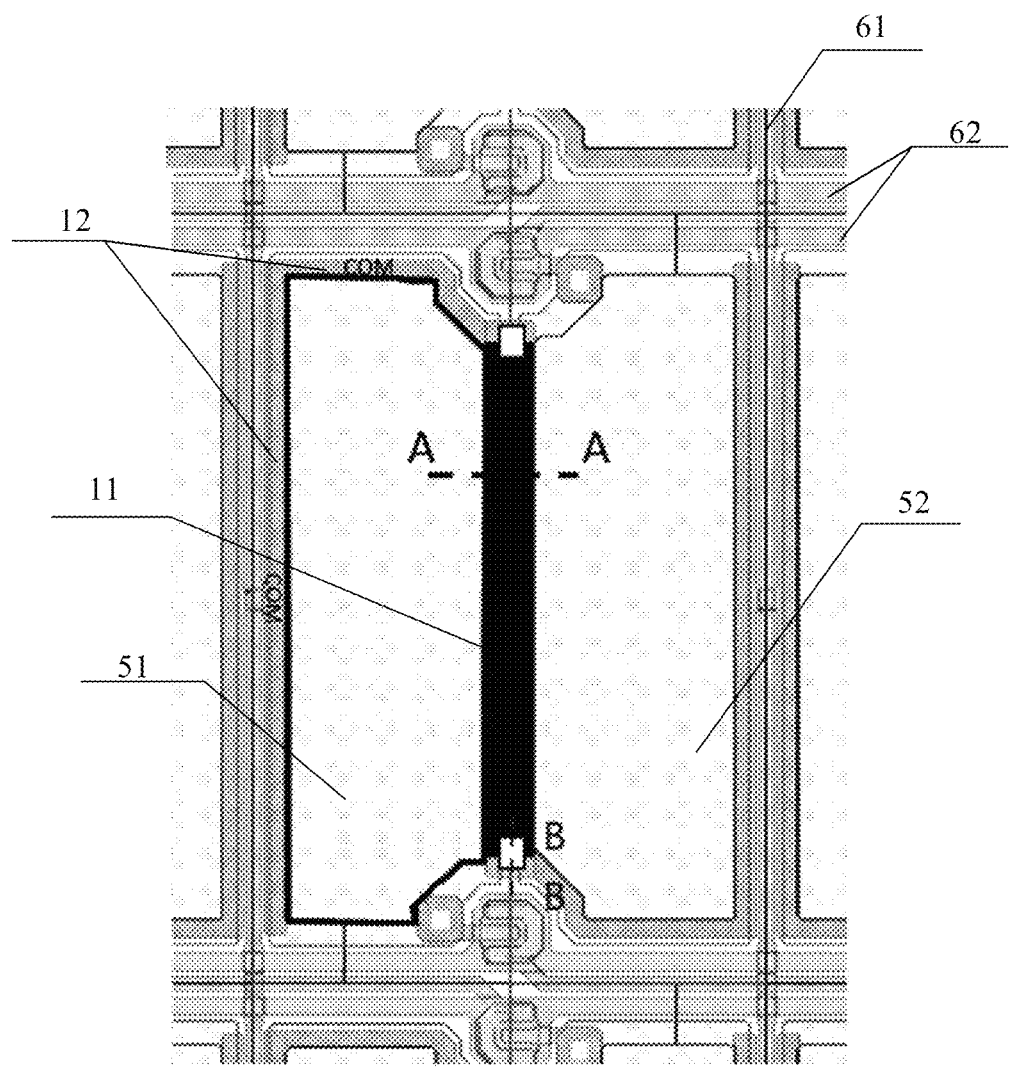
FIG. 3 is a plan view of a part of an array substrate in some embodiments of the present disclosure.
Figure 4:
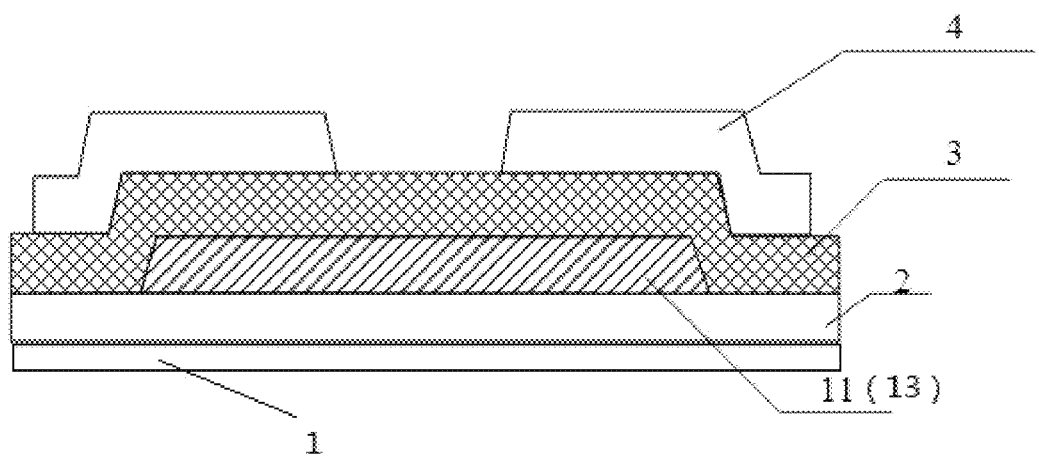
FIG. 4 is a sectional view of the array substrate taken along line A-A of FIG. 3.

Referring to FIGS. 3 and 4, the array substrate in some embodiments of the present disclosure includes: mutually intersected gate lines 62 and data lines 61, and a plurality of pixel unit pairs arranged in an array and defined by the gate lines 62 and data lines 61. Two of the gate lines 62 are arranged between the pixel unit pairs in adjacent rows, and each of the pixel unit pairs includes a first pixel unit 51 and a second pixel unit 52. The array substrate is of a Z-inverted-shaped pixel structure, and a gate insulation layer 2, a first metal layer 11, a passivation layer 3 and a pixel electrode layer 4 are stacked on a base substrate 1 and between the first pixel unit 51 and the second pixel unit 52.

An orthographic projection of the pixel electrode layer 4 onto the base substrate 1 partially overlaps an orthographic projection of the first metal layer 11 onto the base substrate 1 to form a storage capacitor, and the first metal layer 11 is connected to a common electrode layer 12 of each pixel unit pair in a lap joint manner, so as to enable the first metal layer 11 to be electrically connected to the common electrode layer 12.

In such a structure, the first metal layer 11 and the pixel electrode layer 4 together form a storage capacitor, thereby decreasing a thickness of a dielectric between two electrodes of the storage capacitor and increasing a capacitance of the storage capacitor. Therefore, it is able to reduce the size of the first metal layer 11 while ensuring a large enough storage capacitance, thereby increasing an aperture ratio.

Specifically, the first metal layer 11 is located between the first pixel unit 51 and the second pixel unit 52 of the pixel unit pair, and is parallel to each of the data lines 61. The first metal layer 11 may be arranged in an identical layer to a source and drain electrode layer 13 of a thin film transistor of each pixel unit pair, the first metal layer 11, the pixel electrode layer 4 and the passivation layer 3 located between the first metal layer 11 and the pixel electrode layer 4 together form the storage capacitor Cst, and the common electrode layer 12 is arranged in an identical layer to a gate electrode layer 14 of the thin film transistor of the pixel unit pair. As shown in FIG. 3, the common electrode layer 12 and the first metal layer 11 are arranged around the first pixel unit 51 and the second pixel unit 52, orthographic projections of the common electrode layer 12 and the first metal layer 11 onto the base substrate 1 partially overlap an orthographic projection of the pixel electrode layer 4 onto the base substrate 1, and thus the common electrode layer 12 and the pixel electrode layer 4, the first metal layer 11 and the pixel electrode layer 4 together form the storage capacitor of the first pixel unit 51 and the second pixel unit 52. The gate insulation layer 2 and the passivation layer 3 are dielectric between the common electrode layer 12 and the pixel electrode layer 4, and a specific structure thereof may be referred to FIG. 2. In the related art, the common electrode is arranged between the first pixel unit 51 and the second pixel unit 52, while in the embodiments of the present disclosure, the first metal layer 11 is arranged between the first pixel unit 51 and the second pixel unit 52. Therefore, as compared with the related art, a dielectric thickness of the storage capacitor in the part between the first pixel unit 51 and the second pixel unit 52 is reduced. Specifically, a thickness of the passivation layer 3 is 2500 Å-6000 Å, a thickness of the gate insulation layer 2 is 3000 Å-4000 Å, and the dielectric thickness of the storage capacitor in the part between two pixel units of the pixel unit pair is reduced significantly. Therefore, the storage capacitance in the embodiments of the present disclosure can be increased by 25% in compared with the storage capacitance in the related art.

Compared with the related art, the storage capacitance in the embodiments of the present disclosure is increased significantly. Therefore, in the case of ensuring a large storage capacitance, the size of the first metal layer 11 may be changed to increase an aperture ratio of pixels.

Figure 5:
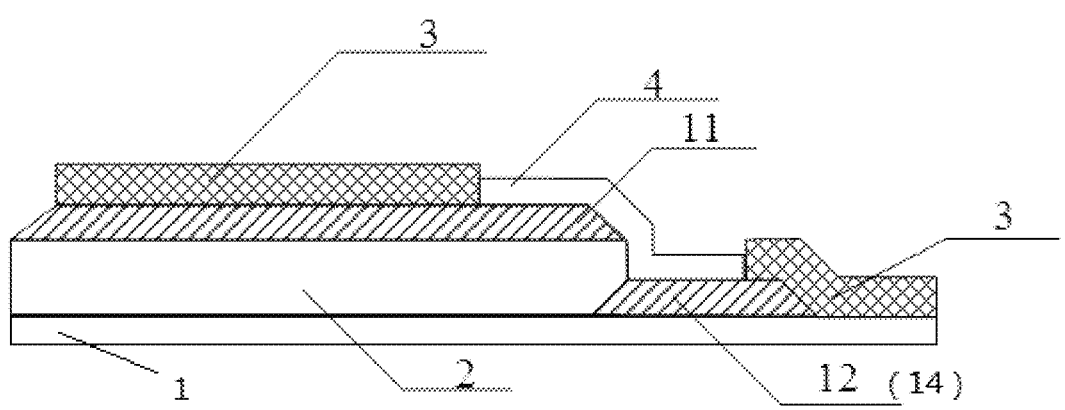
FIG. 5 is a sectional view of the array substrate taken along line B-B of FIG. 3.

Referring to FIG. 5, the passivation layer 3 of the array substrate is provided with a lapping hole configured to connect the first metal layer 11 to the common electrode layer 12 of the pixel unit pair in a lap joint manner. A conductive layer is formed in the lapping hole to achieve the first metal layer 11 being connected to the common electrode layer 12 of the pixel unit pair in a lap joint manner.

Specifically, the conductive layer in FIG. 5 may be arranged in an identical layer to the pixel electrode layer 4, and the first metal layer 11 is electrically connected to the common electrode layer 12 via the conductive pixel electrode layer 4.

In some embodiments of the present disclosure, the common electrode layer 12 is located at a side of the first metal layer 11 closing to the base substrate 1.

In some embodiments of the present disclosure, an orthographic projection of the passivation layer 3 onto the base substrate 1 at least partially overlaps orthographic projections of the pixel electrode layer 4 and the first metal layer 11 onto the base substrate 1.

In some embodiments of the present disclosure, the orthographic projection of the first metal layer 11 onto the base substrate 1 at least partially overlaps an orthographic projection of the common electrode layer 12 onto the base substrate 1.

In some embodiments of the present disclosure, an extending direction of the first metal layer 11 is parallel to an extending direction of the data lines 61.

In some embodiments of the present disclosure, the common electrode layer 12 and the first metal layer 11 are arranged around the first pixel unit 51 and the second pixel unit 51, and the common electrode layer 12 and the first metal layer 11 around the first pixel unit 51 and the second pixel unit 51 form a Z-shaped structure.

In some embodiments of the present disclosure, the conductive layer is in direct contact with the first metal layer 11 and the common electrode layer 12.

The array substrate in some embodiments of the present disclosure may be a TN-LCD array substrate, and by applying storage capacitor in the array substrate in some embodiments of the present disclosure to a TN-LCD product, it is able to effectively avoid a voltage change of pixel electrodes caused by a gate voltage coupling. Moreover, as the number of pixels of the TN product in the related art gradually increases, the size of the pixel may decrease and then a storage capacitance of the unit pixel may decrease. Therefore, a capacitance of the storage capacitor of the array substrate in some embodiments of the present disclosure may be effectively increased.

The array substrate in some embodiments of the present disclosure is of a Z-inverted-shaped pixel structure, and the array substrate with the Z-inverted-shaped pixel structure is advantageous in reducing power consumption.

In the process of forming the array substrate in some embodiments of the present disclosure, a layer structure in the related art is based without adding any new process. The first metal layer and the source and drain electrode layer of the thin film transistor are arranged in an identical layer, after the source and drain electrode layer is formed, a shape of a mask plate is changed, and a layer structure is remained. Similarly, after the passivation layer is formed, an etching process is additionally performed in a lap joint region where the first metal electrode layer is connected to the common electrode layer in a lap joint manner to form a lapping hole. In such a manner, when the pixel electrode layer is formed, the first metal electrode layer may be connected to the common electrode layer in a lap joint manner.

In the an array substrate in some embodiments of the present disclosure, the gate insulation layer, the first metal layer, the passivation layer and the pixel electrode layer are stacked and are arranged between a pair of pixel unit, and the first metal layer and the source and drain electrode layer of the thin film transistor are arranged in an identical layer. In such an arrangement, a dielectric thickness between two electrodes of the storage capacitor is reduced, thereby increasing the storage capacitance, and on the basis of ensuring a large aperture ratio, the size of the first metal layer may also be reduced, thereby increasing the aperture ratio.

Various embodiments in the specification are described in a progressive manner, the differences from other embodiments are emphatically illustrated in each embodiment, and reference can be made to other embodiments for understanding the same or similar parts of the embodiments. Since the device disclosed by the embodiments corresponds to the method disclosed by the embodiments, the device is described briefly and reference is made to the descriptions in the method for related parts.

Although some embodiments of the present disclosure are described, those skilled in the art can make additional changes and modifications to these embodiments once they learn the basic inventive concept. Therefore, the appended claims are intended to be interpreted as comprising the above embodiments and all changes and modifications that fall within the scope of the embodiments of the present disclosure.

It should be noted that relation terms such as "first", "second" and the like used in the present disclosure are merely used to distinguish one entity or operation from another entity or operation, and do not necessarily require or imply any such actual relation or order between these entities or operations. Such terms as "including", "includes", "include", "comprise", "comprises" or "comprising" are intended to cover non-exclusive inclusions such that a process, a method, an article, or a terminal device including a list of elements not only includes these elements but also includes unspecified elements, or other elements that are inherent to the process, the method, the article, or the terminal device. In the case of no more limitation, an element defined by a sentence "including a sub-element" does not exclude other same sub-element existing in the process, the method, the article, or the terminal device The above embodiments are merely some embodiments of the present disclosure, but the protection scope of the present disclosure is not limited thereto. Any changes and substitutions that are easily thought of by those skilled in the art should fall within the protection scope of the present disclosure. Therefore, the protection scope of the present disclosure should be based on the claims.

What is claimed is:

1. An array substrate, comprising a plurality of pixel unit pairs arranged in an array and defined by mutually intersected gate lines and data lines;
    wherein two of the gate lines are arranged between the pixel unit pairs in adjacent rows, each of the pixel unit pairs comprises a first pixel unit and a second pixel unit, and a gate insulation layer, a first metal layer, a passivation layer and a pixel electrode layer are stacked on a base substrate and between the first pixel unit and the second pixel unit; and
    wherein an orthographic projection of the pixel electrode layer onto the base substrate at least partially overlaps an orthographic projection of the first metal layer onto the base substrate to form a storage capacitor, and the first metal layer is connected to a common electrode layer of each pixel unit pair in a lap joint manner;
    wherein the base substrate is at a side of the gate insulation layer away from the first metal layer, the common electrode layer is at a side of the first metal layer close to the base substrate, and a vertical distance between the first metal layer and the base substrate is greater than a vertical distance between the common electrode layer and the base substrate.

2. The array substrate according to claim 1, wherein the first metal layer is arranged in an identical layer to a source and drain electrode layer of a thin film transistor of each pixel unit pair.

3. The array substrate according to claim 1, wherein the common electrode layer is arranged in an identical layer to a gate electrode layer of a thin film transistor of each pixel unit pair.

4. The array substrate according to claim 1, wherein the passivation layer is provided with a lapping hole configured to connect the first metal layer to the common electrode layer of each pixel unit pair in the lap joint manner, and a conductive layer is arranged in the lapping hole to enable the first metal layer to be connected to the common electrode layer of each pixel unit pair in the lap joint manner.

5. The array substrate according to claim 4, wherein the conductive layer is arranged in an identical layer to the pixel electrode layer.

6. The array substrate according to claim 1, wherein the array substrate is a twisted nematic liquid crystal display (TN-LCD) array substrate.

7. The array substrate according to claim 1, wherein a thickness of the passivation layer is from 2500 Å to 6000 Å.

8. The array substrate according to claim 1, wherein a thickness of the gate insulation layer is from 3000 Å to 4000 Å.

9. The array substrate according to claim 1, wherein an orthographic projection of the passivation layer onto the base substrate at least partially overlaps orthographic projections of the pixel electrode layer and the first metal layer onto the base substrate.

10. The array substrate according to claim 1, wherein the orthographic projection of the first metal layer onto the base substrate at least partially overlaps an orthographic projection of the common electrode layer onto the base substrate.

11. The array substrate according to claim 1, wherein an extending direction of the first metal layer is parallel to an extending direction of each of the data lines.

12. The array substrate according to claim 1, wherein the common electrode layer and the first metal layer are arranged around the first pixel unit and the second pixel unit.

13. The array substrate according to claim 4, wherein the conductive layer is in direct contact with the first metal layer and the common electrode layer.

14. A display panel, comprising an array substrate, wherein the array substrate comprises a plurality of pixel unit pairs arranged in an array and defined by mutually intersected gate lines and data lines;
wherein two of the gate lines are arranged between the pixel unit pairs in adjacent rows, each of the pixel unit pairs comprises a first pixel unit and a second pixel unit, and a gate insulation layer, a first metal layer, a passivation layer and a pixel electrode layer are stacked on a base substrate and between the first pixel unit and the second pixel unit; and
wherein an orthographic projection of the pixel electrode layer onto the base substrate at least partially overlaps an orthographic projection of the first metal layer onto the base substrate to form a storage capacitor, and the first metal layer is connected to a common electrode layer of each pixel unit pair in a lap joint manner;
wherein the base substrate is at a side of the gate insulation layer away from the first metal layer, the common electrode layer is at a side of the first metal layer close to the base substrate, and a vertical distance between the first metal layer and the base substrate is greater than a vertical distance between the common electrode layer and the base substrate.

15. A display device, comprising a display panel, wherein the display panel comprises an array substrate, and the array substrate comprises a plurality of pixel unit pairs arranged in an array and defined by mutually intersected gate lines and data lines;
wherein two of the gate lines are arranged between the pixel unit pairs in adjacent rows, each of the pixel unit pairs comprises a first pixel unit and a second pixel unit, and a gate insulation layer, a first metal layer, a passivation layer and a pixel electrode layer are stacked on a base substrate and between the first pixel unit and the second pixel unit; and
wherein an orthographic projection of the pixel electrode layer onto the base substrate at least partially overlaps an orthographic projection of the first metal layer onto the base substrate to form a storage capacitor, and the first metal layer is connected to a common electrode layer of each pixel unit pair in a lap joint manner;
wherein the base substrate is at a side of the gate insulation layer away from the first metal layer, the common electrode layer is at a side of the first metal layer close to the base substrate, and a vertical distance between the first metal layer and the base substrate is greater than a vertical distance between the common electrode layer and the base substrate.

* * * * *